Figure 1:
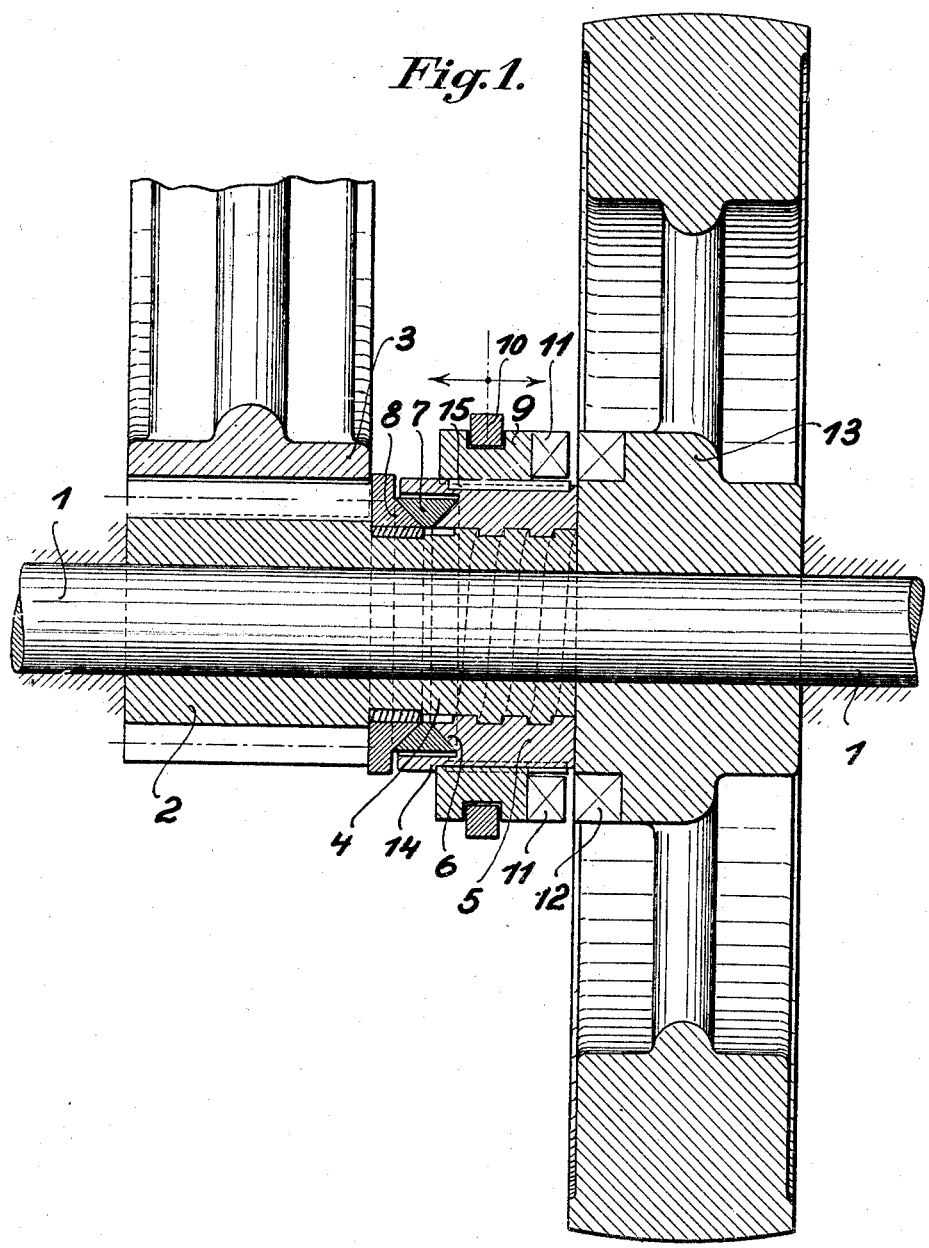

Jan. 22, 1929.

O. GEORG 1,699,838

COUPLING DEVICE

Filed Feb. 12, 1927    2 Sheets-Sheet 1

Inventor
Otto Georg
by ———
Attorney

Patented Jan. 22, 1929.

1,699,838

UNITED STATES PATENT OFFICE.

OTTO GEORG, OF DUSSELDORF, GERMANY.

COUPLING DEVICE.

Application filed February 12, 1927, Serial No. 167,807, and in Germany February 9, 1926.

This invention refers broadly to improvements in elastic shaft coupling means, and among other objects and advantages it is intended to provide means of avoiding the shocks and jars incident upon the operation of the clutch or coupling means, particularly in the case of heavy machinery. In view thereof the invention is intended to provide means for effecting the coupling of a rotating coupling member with a relatively stationary coupling member coaxial therewith by positively operating members and in such a manner that the occurrence of jars and shocks is substantially entirely avoided. Coupling and clutching means of the kind referred to are of particular importance in the case of machinery the operation of which is regulated by strokes, such as eccentric presses, horizontal forging machines, bending machines, fin-removing machines, shears, dies and the like in which such a coupling is to take place after each working stroke while the driven shaft of the working machine is thereafter rendered inoperative again.

A clutch coupling constructed according to this invention renders it possible to effect the coupling of two coaxially disposed shafts, one of which is rotated, while the other is at rest, in a very short time and without shocks, or jars and back-shocks by making use of a screw or the like for the purpose of converting the radial peripheral pressure of a rigid coupling, actuated in the first place, into an axial pressure adapted for expanding a ring spring which operates as a supplemental cushioning friction clutch or coupling and by means of which the non-moving coaxial shaft is smoothly carried along with the moving part. The said rigid coupling may be of any construction desired.

The invention will be more particularly described by reference to the accompanying drawings showing by way of exemplification two embodiments of the principles of this invention, the same reference characters being used to designate corresponding parts in the two figures.

Figure 2:
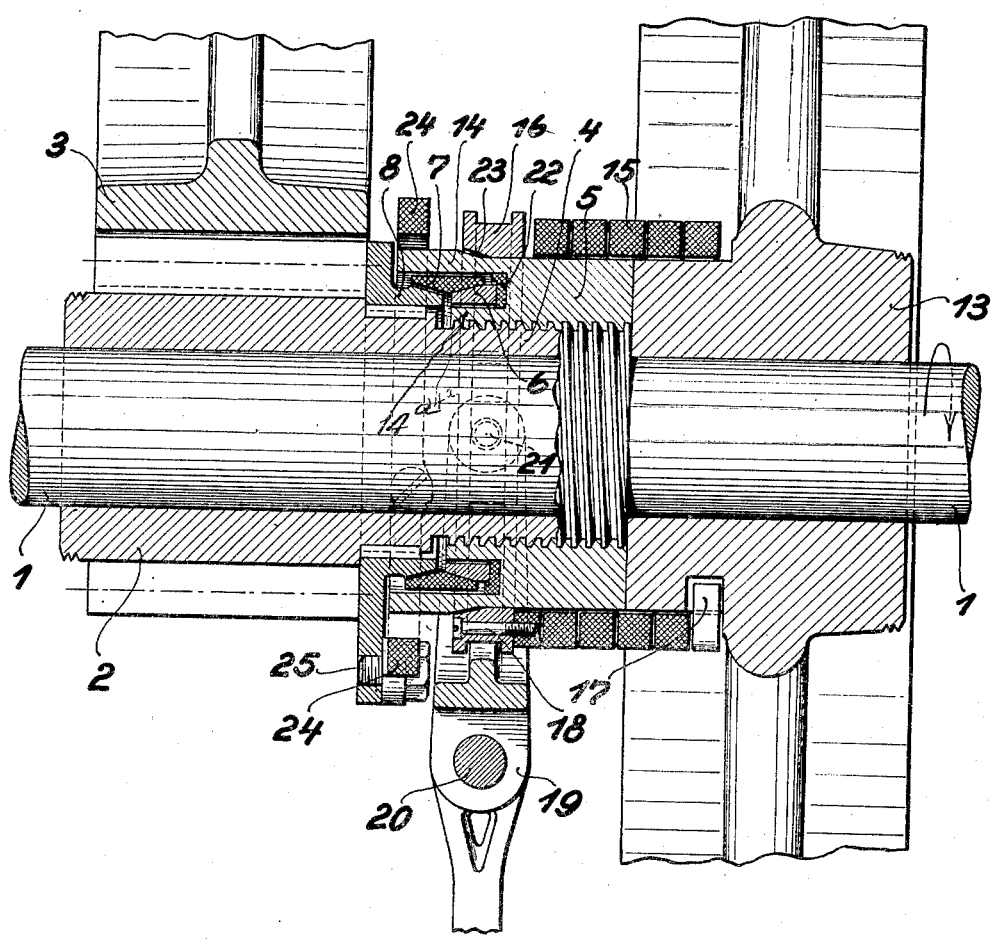

In the drawings:—Figure 1 shows a clutch or coupling according to this invention in axial sectional view with a simple clutch coupling. Figure 2 is a similar sectional view, but showing the employment of a helical spring coupling as an auxiliary coupling.

Now referring particularly to Figure 1 of the drawing:—1 indicates a shaft upon which the pinion or toothed gear 2 is loosely rotatable which is in mesh with the temporarily driven gear wheel 3, while 13 indicates a driving fly wheel mounted on said shaft 1 and adapted to be continuously rotated. At its side confronting the fly wheel the pinion 2 is provided with a hub or collar 4 which extends up to the hub of the fly wheel 13 and is provided exteriorly with screw threads onto which the screw threaded sleeve 5 is engaged. At its one end this sleeve 5 with its flat front surface rests against the hub of the fly wheel 13, while at its other end the sleeve terminates in a cone 6 and an annular flange extension 14. The conical ring 8 is keyed or otherwise rigidly connected to the pinion or gear 2. Between the two cones and within the flange extension 14 of the sleeve 5 ring spring 7 capable of expansion under axial pressure and of contracting by its inherent resiliency when such pressure is removed and which is conically bevelled off on opposite sides is disposed the conical surfaces of which correspond to those of the two cones 6 and 8. To the threaded sleeve 5 a ring 9 with clutch teeth 11 is feathered by means of splines or keys 15, so as to be axially displaceable and in such a manner that it may be axially moved in the well known manner by a sliding ring 10 housed in a groove of the ring 9 and secured to a forked lever, not shown in the drawing. The hub of the fly wheel at its side confronting the said ring 9 is provided with clutch teeth 12 adapted to fit into the spaces between the teeth 11 of the said ring 9.

If it is desired to effect the coupling of the pinion or gear 2 with the rotating fly wheel 13, the ring 9 is slid in the direction of the fly wheel 13 by means of the forked lever referred to and by the sliding ring 10, so that the teeth 11 become engaged with the teeth 12 of the fly wheel, and the ring 9 with the threaded sleeve 5 will be rotated in the same direction and with the same angular velocity as the fly wheel 13. The coupling operation in view of the relatively small mass of the parts to be moved, the ring 9 and the threaded sleeve 5 takes place without any noticeable shock. Upon its rotation the sleeve 5 is axially displaced upon the threaded part of the collar 4 of the pinion 2 towards the ring spring 7, and by its conical surface 6 the sleeve 5 forces the ring 7 against the cone 8, thereby causing the ring 7 to expand and to accordingly produce an elastic slip-friction pressure corresponding to this expansion between the conical surfaces 6, 7 and 8, which pressure is sufficient to impart a gradually increasing speed of rotation to the pinion or gear 2 and to the gear wheel 3, until the tension has become large enough, or until the spring-acting ring 7 will finally come to bear against the outside of the enlarged sleeve portion 14, and the pressure upon the conical surfaces becomes so large that they cannot slide any more upon each other, so that the pinion or gear 2 has assumed the same angular velocity as the fly wheel. In the expansion of the conical ring spring 7 the possibility of a recoil is entirely prevented by the conical surfaces, so that the entire coupling procedure takes place, owing to the cushioning action of the spring 7, in a smooth, continuous, steady manner. The disengagement of the coupling is effected by merely axially displacing the coupling ring 9 towards the pinion 2.

In the modified construction according to Figure 2 of the drawing a helical spring coupling is used as an auxiliary coupling instead of the clutch or toothed coupling heretofore described. Referring now more particularly to Figure 2, the shaft is indicated at 1 upon which the pinion or toothed gear 2 is loosely and rotatably mounted, so as to be in engagement with the gear wheel 3 to be driven, while the fly wheel 13 is continuously rotated on the shaft 1. The pinion 2 at its side confronting the fly wheel is provided with a sleeve or collar 4 which extends into engagement with the fly wheel and is provided with the exterior threads upon which the screw-threaded sleeve 5 is engaged. The front face of this screw-threaded sleeve 5 bears with its flat surface against the front face of the hub of the fly wheel, while at its opposite side the sleeve 5 carries a pressure ring 22 and a conical ring 6 which is loose about the inner flange extension 14$^a$ at the left hand end of sleeve 5 and disposed in an annular groove formed between said flange 14$^a$ and the flange extension 14 of the sleeve, the outer face of which flange 14 is provided with a conical cam surface 23. To the pinion 2 at its side confronting the fly wheel a flanged ring 8 is secured which terminates in a conical surface. Around this conical surface and the conical surface of the ring 6 there is disposed a ring spring 7 with two opposite conical surfaces which is surrounded with play by the annular extension 14 of the threaded sleeve 5.

The hub of the flywheel 13 and the threaded sleeve 5 are surrounded by a helical spring coupler 15 which at one end by the hook 17 is attached to or engaged with the hub of the fly wheel, while at its other end it is connected by the screw 18 to the so-called "exciter-ring" 16. This ring 16 is adapted to be axially displaced for the purpose of actuating the coupler 15 by means of the forked lever 19 rockingly mounted on the stationary shaft 20 and by the studs 21 engaging the annular groove of the ring 16. During this displacement in the direction of the pinion 2 the inner conical cavity of the rotating ring 16 becomes engaged with the non-moving conical surface 23, and the ring 16 which is continuously rotated by the coupler 15 and by the fly wheel 13 will lag behind in its rotation on account of the friction between the two conical surfaces 16, 23 mentioned, with relation to the coupler 15 secured to the ring 16, that is to say, the said coupler 15 becomes twisted together and thereby tightly engaged around the hub of the fly wheel and the threaded sleeve 5, both of which are thereby tightly coupled with each other. In view of the relatively small mass of the threaded sleeve 5 the coupling thereof with the fly wheel is effected without any noticeable shock.

As soon as the coupling operation has been performed in the manner described, the screw threaded sleeve 5 will be moved on its threads towards the ring spring 7 with its two conical surfaces, forcing the ring 7 against the conical ring 8 and resulting in the expansion of said ring 7. By means of the friction between said ring and the conical surfaces 6 and 8 the pinion or gear 2 is gradually and smoothly carried along, until it has assumed the same angular velocity as the fly wheel. The expansion of the ring 7 is limited by the flanged portion 14 of the screw-threaded sleeve 5, so as to prevent excessive strain on the ring spring 7.

The disengagement of the coupling in this modification of the new coupling device is effected by sliding the exciter ring 16 in the direction of the fly wheel in the axial direction, thereby causing the cone 23 to become disengaged from the exciter ring. To the annular flange 8 one end of an annular spring 24 is screw-threadedly secured, while its other end is secured to the threaded sleeve 5, 14. This annular spring which operates as a return spring will then rotate the threaded sleeve backwards, so as to release the strain on the double conical ring spring 7, and break the coupling between the fly wheel 13 and the pinion 2.

It has already been mentioned and should be understood that the principle of the new clutch or coupling means may be carried out in combination with any suitable, tightly acting coupling device as an auxiliary coupling, so that it will be evident that all combinations of the kind referred to will be embraced by the scope and ambit of this invention, and other modifications and changes may be made in the construction and arrangement of parts to suit varying conditions of application, and without thereby deviating from the spirit of this invention, as set forth and specified in the appended claims.

I claim:—

1. In a coupling device in combination, a driving member and a driven member, a coupling member, an intermediate member, adapted to be connected with the driving member by the coupling member and slidingly and rotatably connected with the driven member, and an expansible and contractible friction ring spring between the intermediate member and the driven member, and adapted to impart the movement of the member to said driven member.

2. In a coupling device in combination, a driving member and a driven member, an intermediate rotatable member, a coupling member, for connecting the intermediate member with the driving member, and a substantially cross-sectionally conical resilient expansible and contractible member between the intermediate member and the driven member, and adapted to transmit the rotation of the intermediate member to the driven member.

3. In a coupling device in combination, a driving member and a driven member, an intermediate rotatable member, a coupling member, for connecting the intermediate member with the driving member, a substantially cross sectionally conical resilient expansible and contractible member between the intermediate member and the driven member for connecting said members upon the axial displacement of the intermediate member, and a return spring connecting the driven member to the intermediate member.

4. In a coupling device in combination, a driving member and a driven member, an intermediate rotatable member, a coupling member, for connecting the driving member with the intermediate member, operating means for the coupling member, and a resilient expansible and contractible member between the intermediate member and the driven member, for connecting the driven member to the intermediate member.

5. In a coupling device in combination, a driving member and a driven member, an intermediate rotatable and axially displaceable member in threaded engagement with the driven member, a coupling member for connecting the driving member and the intermediate member, and a substantially cross-sectionally conical expansible and contractible resilient member between the intermediate member and the driven member and frictionally engageable therewith.

6. In a coupling device in combination, a driving member and a driven member, an intermediate rotatable and axially displaceable member, coupling means for connecting the intermediate member with the driving member, said intermediate and driven members having friction surfaces and a resilient expansible and contractible member between said friction surfaces of the intermediate member and the driven member for operatively connecting the same upon the axial displacement and rotation of the intermediate member.

7. In a coupling device in combination, a driving member, a driven member, an intermediate rotatable and axially displaceable member, a coupling member for connecting the intermediate member with the driving member, a resilient expansible and contractible member between the intermediate member and the driven member, for frictionally connecting the same upon the rotation and axial displacement of the intermediate member, and an annular peripheral flange-like extension on said intermediate member surrounding the resilient member.

8. In a coupling device in combination, a driving member, a driven member, an axially displaceable rotatable sleeve, screw-threadedly mounted on said driven member, a coupling member, for connecting the driving member with the sleeve, a resilient expansible and contractible member between the sleeve and the driven member, for frictionally connecting the same on the axial displacement of the sleeve, and an annular, peripheral, flange-like extension on said sleeve, surrounding the resilient member.

9. In a coupling device, in combination, a driving member, a driven member, an axially displaceable rotatable sleeve, screw-threadedly mounted on said driven member, a coupling member for connecting the driving member with the sleeve, and a resilient expansible and contractible member between the sleeve and the driven member for frictionally connecting the same on the axial displacement of the sleeve.

10. In a coupling device, driving and driven members, a coupling member engageable with and disengageable from the driving member, and a resilient expansible and contractible friction member between the coupling member and the driven member adapted to be placed under pressure by said coupling member for yieldingly and frictionally connecting the same with the driven member.

In testimony whereof I affix my signature.

OTTO GEORG.